United States Patent Office.

HUGO KUNHEIM, OF BERLIN, AND HEINRICH ZIMMERMANN, OF WESSELING, PRUSSIA, GERMANY.

PROCESS OF MAKING FERRO-CYANIDES.

SPECIFICATION forming part of Letters Patent No. 303,437, dated August 12, 1884.

Application filed July 21, 1883. (No specimens.) Patented in Belgium July 5, 1883, No. 61,937; in France July 5, 1883, No. 156,416; in England July 5, 1883, No. 3,342; in Germany July 6, 1883, No. 26,884, and in Italy July 30, 1883, XXXI, 202, and XVII. 15,672.

*To all whom it may concern:*

Be it known that we, HUGO KUNHEIM and HEINRICH ZIMMERMANN, manufacturer, subjects of the King of Prussia, residing, respectively, at Berlin and Wesseling, near Cologne on the Rhine, Prussia, German Empire, have invented certain new and useful Improvements in the Treatment of Materials Containing Ferro-Cyanides for the Production of Prussian Blue; and we do hereby declare the following to be a full, clear, and exact description of the invention, such as will enable others skilled in the art to which it appertains to make and use the same.

The processes heretofore employed for obtaining ferro-cyanides from the spent purifying materials employed in the manufacture of gas were based upon the treatment of such materials with milk of lime or alkaline lyes—an operation generally preceded by a lixiviation with water for the recovery of the ammoniacal salts, and in some cases by treatment with sulphuret of carbon, heavy tar-oils, or other solvents for recovering the sulphur. Experience has demonstrated that this process of obtaining ferro-cyanides leaves much to be desired. If caustic alkalies are used, all the ferro-cyanide contained in the material treated may be recovered in solution, yet it requires such an excess of solvent that this method can not be economically adopted. By our process we recover practically all the ferro-cyanide contained in these refuse or spent materials, and in carrying out our invention the said materials are, as usual, freed from sulphur, and, if necessary or desired, from ammoniacal salts, though the elimination of the sulphur is not absolutely necessary in obtaining the desired end. We prefer, however, to eliminate the sulphur, for the reason that the formation of sulphurets of lime is thereby best avoided. The materials so treated yet contain ammonia combined in an insoluble form with ferro-cyanide, and after being air-dried we mix them intimately with pulverized caustic lime obtained either by air-slaking or by comminuting or pulverizing quicklime, one equivalent of the latter to one equivalent of the ferro-cyanide combination contained in the mass being sufficient to reduce the ferro-cyanide. It is essential that the mixture of the lime with the materials treated should be as intimate and thorough as possible, and this may be effected by manual labor, if desired, though we prefer to effect the mixture mechanically by means of any of the well-known mixing or disintegrating or stirring machines. The mixed materials may now be treated in two ways—namely, first, by charging the same in a dry state into a closed or air-tight receiver, and heating the charge to a temperature varying from 40° to 100° centigrade, to partially eliminate the insoluble ammonia, which may be condensed in the usual manner, then by subjecting the charge to lixiviation in water, whereby a ferro-cyanide of calcium lye is obtained directly; secondly, by lixiviating the material before eliminating the ammonia, whereby an ammoniacal ferro-cyanide of calcium lye is obtained having naturally a strong alkaline reaction. This lye is then carefully neutralized, preferably by means of hydrochloric acid, and heated to ebullition, whereby a not-readily soluble cyanide combination is obtained, composed, essentially, of ferro-cyanide of calcium ammonium, $Ca(NH_4)2FeCy_6$.

We will here remark that the lyes obtained by the old processes of treatment with milk of lime may be neutralized and heated to ebullition in order to obtain ferro-cyanide of calcium ammonium as a precipitate. By treatment with caustic lime in close vessels the ferro-cyanide of calcium ammonium is decomposed and the ammonia recovered, and a pure ferro-cyanide of calcium lye obtained. The neutralization and precipitation by heating the lye to ebullition may also be applied to the first described method of treating the materials, although in most cases these will be dispensed with.

The ferro-cyanide of calcium lye may be treated in the usual way with protoxide of iron, and the precipitate oxidized to obtain ferroso-ferro-cyanide of iron, (Prussian blue.) If, however, it is desired to obtain ferri-cyanide salts, then we convert the lye into a ferro-cyanide of calcium potassium lye, by evaporating the ferro-cyanide of calcium-lye and decomposing the same with as much chloride of potassium as is necessary to the formation of ferro-cyanide of calcium potassium, $CaKa_2FeCy_6$. The described double cyanuret separates either while the lye is cold or when warmed. It is then removed therefrom by filtration and freed from the mother-liquor by lixiviation. The double cyanuret may thus be converted into a ferri-cyanide salt by means of a solution of carbonate of potassium. By this method of treatment but one half the quantity of carbonate of potassium is necessary, while the other half is replaced by the cheaper chloride of potassium.

Instead of the carbonate of potassium, carbonate of sodium may be employed for decomposing the ferro-cyanide of calcium, whereby a mixture of potassium and sodium proto-cyanide of iron is obtained.

By means of the described methods not only the spent purifying materials derived from the manufacture of gas may be treated, but any other substance or material containing a ferro-cyanide.

Having thus described our invention, what we claim, and desire to secure by Letters Patent of the United States, is—

The process of obtaining ferro-cyanide of calcium potassium by precipitating ferro-cyanide of calcium from its solution by means of chloride of potassium for the production of ferro-cyanide of potassium or other ferro-cyanide combinations, as set forth.

In testimony whereof we affix our signatures in presence of two witnesses.

HUGO KUNHEIM.
HEINRICH ZIMMERMANN.

Witnesses:
  B. ROI,
  ADOLF DEMELINS.